United States Patent [19]
Urenda

[11] 3,715,535
[45] Feb. 6, 1973

[54] ACCELERATION ACTUATED SWITCH

[75] Inventor: Ruben S. Urenda, Albuquerque, N. Mex.

[73] Assignee: The United States of America as represented by the United States Atomic Energy Commission

[22] Filed: July 20, 1971

[21] Appl. No.: 164,378

[52] U.S. Cl..................................200/61.53, 73/1 D
[51] Int. Cl.............................................H01h 35/14
[58] Field of Search......................200/61.45–61.53; 340/261, 262

[56] References Cited

UNITED STATES PATENTS

| | | | |
|---|---|---|---|
| 3,096,411 | 7/1963 | Chabrek et al. | 200/61.53 |
| 3,057,976 | 10/1962 | Weaver | 200/61.45 R |
| 3,018,664 | 1/1962 | Humble | 200/61.53 X |
| 3,593,277 | 7/1971 | Faude | 340/262 |

Primary Examiner—Robert K. Schaefer
Assistant Examiner—M. Ginsburg
Attorney—Roland A. Anderson

[57] ABSTRACT

An electrical switch actuatable at one or more levels of acceleration including a sealed tubular housing having spaced apart reset actuate walls with damping fluid filling a chamber therebetween, a movable sensing mass within the chamber carrying a shorting conductive member, a helical spring intermediate the actuate wall and the sensing mass to position the sensing mass at an initial location adjacent the reset wall and to resist movement of the sensing mass when the mass is subjected to acceleration forces, electrical contacts extending through the housing walls into the chamber in the path of movement of the shorting member, and means carried by a housing wall accessible from the exterior of the housing for moving at least one of the contacts to a position in substantially transverse alignment with another contact for generally simultaneous contact with portions of the shorting member after some desired movement of the sensing mass. Provision is also made by means of an annular orifice to minimize circuit closures from extraneous shocks and by a bimetallic curved ring to compensate for temperature caused changes in spring characteristics.

4 Claims, 4 Drawing Figures

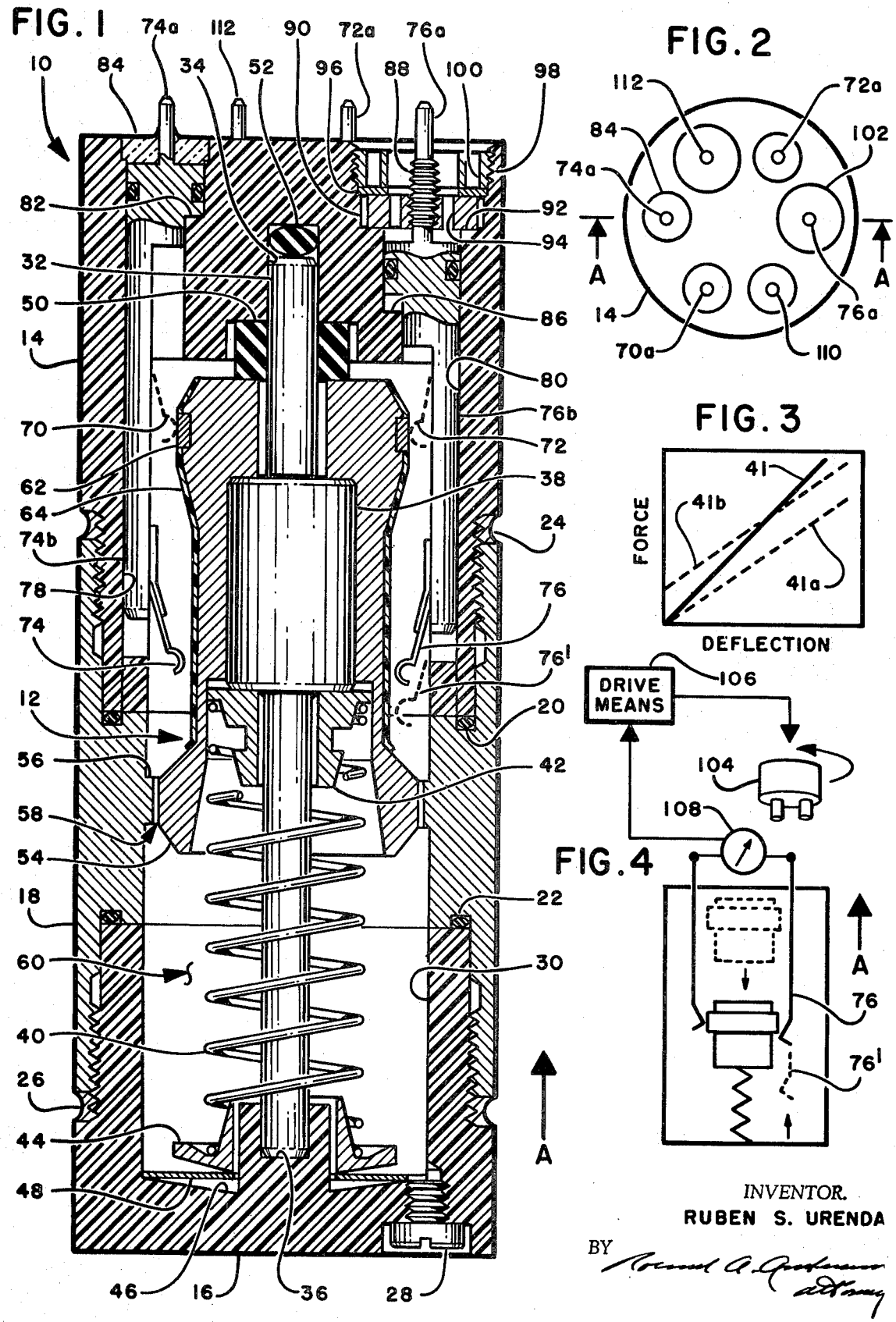

ACCELERATION ACTUATED SWITCH

BACKGROUND OF INVENTION

Accelerometers, acceleration actuated switches and inertial sensing devices are widely used to measure accelerations or other forces resulting from vibrations, changes in speed, or the like. Such devices may include some form of sensing mass suspended within the system or device so as to be affected by acceleration or other forces and moved against some sort of sensing mechanism, such as the closure or opening of an electrical switch or contacts. Often, the sensing mass is positioned within the device and biased in some direction by a force biasing mechanism. When the device is accelerated in a direction which is aligned with that of the force bias, the sensing mass may be "set-back" to provide the desired circuit closure or opening. Even with precise manufacturing techniques, it may be difficult to manufacture large numbers of such devices which will provide the desired circuit functioning at the same level of acceleration forces. Once a device is assembled in its final form, there is generally no convenient provision for modifying or changing the level at which the acceleration actuated switch will close to insure that the device will operate as planned.

There are applications for acceleration actuated switches where it would be desirable not only to provide an electrical indication of a particular acceleration force level, but also to provide such an indication at multiple levels, in which any one, or all, may be precisely controlled. It would thus be desirable to provide an acceleration actuated switch which would provide an electrical indication of the device being subjected to different levels of acceleration forces.

Many acceleration actuated switches, during handling and use, may be subjected to extraneous shocks or other forces which may inadvertently provide a circuit closure or opening. It would therefore be desirable that the acceleration actuated switch be insensible to such shocks.

Acceleration actuated switches are many times used in environments having widely varying temperature. Many of the materials used in the acceleration actuated switch may be sensitive to temperature changes which will cause the device to operate at some acceleration level different from that desired. These temperature caused variations may be of sufficient magnitude to provide some malfunction of the equipment to which the acceleration actuated switch is connected.

SUMMARY OF INVENTION

In view of the above, it is an object of this invention to provide an acceleration force actuated switch which may be precisely adjusted after the entire switch is assembled and enclosed within a sealed housing.

It is a further object of this invention to provide an acceleration force actuated switch which is capable of providing electric circuit indications at different levels of acceleration.

It is a further object of this invention to provide an acceleration force actuated switch which is relatively insensitive to extraneous shocks and vibrations.

It is still a further object of this invention to provide an acceleration actuated switch which automatically compensates for variations in temperature to which it may be subjected.

It is an additional object of this invention to provide an acceleration force actuated switch which is of simple and rugged construction.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

This invention relates to an acceleration actuated switch including, as shown, a sealed tubular housing having reset and actuate walls forming a chamber within the housing, a sensing mass within the chamber including an electrically conductive member on the periphery thereof, means for movably supporting the sensing mass within the chamber, means having a positive spring constant force bias for biasing the sensing mass towards one of the end walls of the housing, a plurality of electrical contacts carried by an end wall of said housing and extending into the chamber and means carried by a housing wall and accessible from the exterior of the housing for moving said contacts with respect to each other.

DESCRIPTION OF DRAWING

The invention is illustrated in the accompanying drawing wherein:

FIG. 1 is a cross-sectional side view taken along line A—A of FIG. 2 of an acceleration force actuated switch incorporating features of this invention;

FIG. 2 is an end view of the switch of FIG. 1;

FIG. 3 is a representative diagram of the affect of change in temperature on the spring constant of a helical spring and compensation for such change; and FIG. 4 is a diagrammatic view showing the adjustment of the accelerometer after assembly has been completed.

DETAILED DESCRIPTION

An acceleration actuated switch embodying features of this invention is illustrated in FIGS. 1 and 2. The switch includes an elongated, sealed, tubular housing 10 having a sensing mass 12 and a desired arrangement of electrical contacts suitably supported therein.

Tubular housing 10 may be made of any appropriate combination of end plates, walls or caps and interconnecting tubular portions which will provide the desired support of the other elements of the switch as well as facilitate assembly of the respective parts of the switch. In the embodiment shown, housing 10 includes generally cup-shaped reset and actuate end members 14 and 16 interconnected by a suitably threaded or otherwise coupled tubular or ring member 18. The end members 14 and 16 and the interconnecting ring member 18 may be sealed at their junction by appropriate sealing rings 20 and 22 and sealant band 24 and 26, if such is desired. Access may be provided to the interior of housing 10 by an appropriately sealed plug 28 in one of the members of the housing 10, such as the actuate end member 16 shown, to permit evacuation, damping fluid filling or the like of the interior or chamber 30 formed by the end walls and tubular portion of the respective hollow members of housing 10.

A stationary shaft 32, which is normally coaxially disposed within housing 10 and held in such position by suitable shaft receiving receptacles 34 and 36 in end members 14 and 16 respectively, is adapted to provide a mounting and guide means for the longitudinally movable sensing mass 12 coaxially arranged about shaft 32, and which mass in turn carries a ball bushing 38 adjacent the shaft for low friction movement therealong. Movement of sensing mass 12 through chamber 30 of housing 10 is controlled by a shaft 32 encircling helical compression spring 40, one end of which normally abuts an annular lip of a mounting member 42 positioned adjacent one end of sensing mass 12 and ball bushing 38 with the other end of spring 40 abutting an annular shoulder or an additional supporting member 44 adjacent to actuate member 16. Support member 44 is held away from a recessed portion 46 of the end wall of actuate member 16 by a suitable bimetallic washer 48 which is described in greater detail below. Sensing mass 12 is cushioned from impact against reset member 14 by a resilient ring 50 while shaft 32 is supported against and maintained in position by a resilient ball or buffer 52.

Sensing mass 12 may include an enlarged portion 54 about its periphery at one location or segment of the mass which coacts with an inwardly projecting portion 56 of chamber 30, in this case depending from tubular member 18 of housing 10, which together form an annular orifice 58. The length of the inwardly extending projection 56 and enlarged portion 54 of mass 12 should be selected to provide restricted movement of mass 12 over some desired distance of travel by metering of a damping fluid 60 (shown only by its location for purpose of illustration) in chamber 30 through orifice 58 for extraneous shocks, vibrations or accelerations which may be, in some instances, of sufficient amplitude to trigger the switch but which do not extend for a sufficient time to represent the acceleration forces under which the switch is designed to be actuated. Thus, for short term forces, sensing mass 12 may begin to move along shaft 32 under the influence of such acceleration forces but if the force does not extend for a sufficient time to permit damping fluid 60 to be metered through orifice 58 before the acceleration force terminates, spring 40 will reset mass 12 to its initial position adjacent to reset member 14.

The damping fluid 60 may be injected through plug 28 into housing 10, filling chamber 30 in a well-known manner, after assembly of the switch and sealing of its respective members. The damping fluid may be any appropriate electrically non-conductive fluid which has a desired viscosity over the operating temperature range of interest, such as certain silicone oils.

Helical spring 40 may be selected to present a positive spring constant force bias against sensing mass 12 which will maintain sensing mass 12 in its initial position adjacent reset member 14 with an increasing bias with spring deflection, as shown by the line 41 in FIG. 3. With this positive spring constant bias, the sensing mass will be inhibited in its movement towards actuate member 16 up to and including the acceleration force levels at which the switch is to be actuated. When the switch is subjected to an acceleration force in the direction of the arrow labeled A in FIG. 1, which is of sufficient amplitude to overcome the force bias of spring 40, the sensing mass will move along shaft 32 towards actuate member 16. If the acceleration force is of sufficient amplitude and duration to overcome the positive spring constant force bias of helical spring 40 and the delay provided by orifice 58 and damping fluid 60, the sensing mass may be driven by the acceleration force completely along shaft 32 until it rests against actuate member 16.

The force deflection curve 41 shown in FIG. 3 is merely representative of the positive spring constant force bias characteristic which is desired for appropriate operation of switch 10. The slope of the force-deflection curve of a particular helical spring will be dependent upon its dimensions, configuration, processing, and material used and will be applicable over some selectable range of "normal" temperature to which the switch may be subjected. If the temperature varies sufficiently above or below that which is considered normal, the slope of the force-deflection curve 41 may change in some manner according to the spring being used and the direction of temperature variation. For example, with increasing temperature, the slope will generally decrease, such as to that shown somewhat exaggerated by dotted line 41a, so that the sensing mass may be more readily moved along shaft 32 with smaller acceleration forces. However, the layers of bimetallic washer 48 are selected so that the washer flexes away from recess 46 with increasing temperature to partially compress spring 40. The partial compression of spring 40 effectively moves the force-deflection curve 41a to a location such as represented by the dotted line 41b to compensate for this change in temperature and to bring the force-deflection curve of the spring 40 at this temperature to a close approximation of its force-deflection curve 41 at normal temperatures. With temperatures that decrease significantly below normal temperatures, the washer 48 will flex in the other direction providing a similar compensation of changes in force-deflection curve slope.

Washer 48 may be any conventional and commercially available bimetallic washer made of two layers of materials having different coefficients of thermal expansion which are formed in a generally cup-shape or arcuate shape with a central bore for ready accommodation with actuate member 16.

Sensing mass 12 may also be provided with an appropriate conductive portion or member which provides an electrically conductive path between contacts, such as a shorting ring 62 positioned about the periphery of sensing mass 12 at a raised or enlarged portion thereof. If the body of sensing mass 12 is made of a conductive or partially conductive material, it may be desirable to provide a dielectric coating 64 about portions of mass 12 which may come into contact with the contact members to be described.

Any combination or number of normally open and normally closed electrical contacts may be arranged within chamber 30 of housing 10 and be carried by an appropriate end member to provide a desired operating sequence for indication of operation or movement of sensing mass 12 in response to acceleration forces. Such electrical contacts may also provide an indication of movement of sensing mass 12 in response to one or more levels of acceleration force within the limits of force bias provided by spring 40. For example, an acceleration actuated switch 10 may include monitor cantilever spring contact arms 70 and 82, shown in FIG. 1 pictorially rotated out of position to indicate their initial normally closed condition in contact with shorting ring 62 when sensing mass 12 is at the initial location adjacent to reset member 14, and in FIG. 2 with their connecting pins 70a and 72a extending from reset end member 14 for connection to an appropriate utilization means. Such monitor contacts may be used to indicate movement of sensing mass 12 away from its initial reset position by opening of a circuit between contacts 70 and 72 through shorting ring 62 when the sensing mass is moved a sufficient distance to permit the contacts to wipe or slide off shorting ring 62 onto dielectric coating 64.

In order to provide acceleration force level detection, the switch may be provided with contact arms 74 and 76 which are positioned between the shorting ring 62, at its initial location adjacent reset wall or member 14, and the position of shorting ring 62 with sensing mass 12 adjacent actuate member 16 at a secondary location along the force-deflection curve of spring 40 representative of an acceleration force level to be detected. The contact arms 74 and 76 are coupled to some sensing means or circuit by pins 74a and 76a and by interconnecting and appropriately shaped conductors 74b and 76b. Conductors 74b and 76b are carried by reset member 14 in appropriate recesses and passageways 78 and 80 within and through member 14 aligned generally longitudinally with the movement of sensing mass 12. Recess and passageway 78 and conductor 74b are cooperatively shaped as to position contact arm 74 in the path of travel of shorting ring 62 with minimum impedance of movement of sensing mass 12. Contact arm 74 may be fixed in position at some desired depth or penetration within chamber 30 by a shoulder 82 in recess and passageway 78 and a correspondingly shaped mating extension of conductor 74b. Chamber 30 may be sealed from the exterior of the switch by appropriate sealing grooves and rings in conductor 74b and/or recess 78, as shown, and by an appropriate sealant 84 filling any remaining portion of recess 78 not filled by conductor 74b or pin 74a.

The location of shoulder 82 and the length of conductor 74b and recess 78 are selected so as to position contact 74 at a secondary location within chamber 30 which intersects the path of travel of shorting ring 62 at a position along the force-deflection curve 41 of spring 40 which represents a particular acceleration force level at which contact closure with contact 76 is desired. Conducting or shorting ring 62 is selected with a width which will insure wiping of contact arm 74 on ring 62, preferably near its center, regardless of variations in manufacture of any of the component parts of the switch, including such variables as spring 40, bimetallic washer 48, orifice 58, etc. Provision is then made to position conductor arm 76 at a precise location where it will wipe against and engage or register with the leading edge portion of shorting ring 62 at the desired acceleration force level. Such is provided by mounting conductive arm 76 on a conductor 76b in recess and passageway 80 which are somewhat modified from conductor 74b and passageway 78 for the fixed contact arm 74. Recess 80 includes a shoulder 86 which is located so that the corresponding extension of conductor 76b, when mated thereagainst, will position contact arm 76 at a position which is further along the path of travel of shorting ring 62 then contact 74 and which is beyond the range of ring 62 when contact 74 wipes thereagainst, as shown by the dotted representation 76' of contact arm 76. Pin 76a is provided with a threaded portion 88 on which an appropriately shaped nut 90 is threaded. With conductor 76b resting against shoulder 86 at the initial position of contact arm 76, nut 90 may be threaded on pin 76a so as to rest against an annular shoulder 92 forming a part of recess and passageway 80. Nut 90 includes two or more bores 94 which are adapted to receive an appropriately shaped spanner wrench. Nut 90 and conductor 76b may be held and locked in position by a washer 96 and a ring 98 having exterior threads engaging similar threads in recess and passageway 80. Ring 98 also includes two or more bores 100 which are also adapted to receive another specially formed spanner wrench. Each of the bores and passageways of nut 90, washer 96 and ring 98 as well as conductor 76b and recess and passageway 80 may be filled, like conductor 74b and recess 78, with a suitable sealant, such as shown by sealant 102 in FIG. 2.

The adjustment of adjustable contact arm 76 may be illustrated in the somewhat pictorial representation of the acceleration actuated switch in FIG. 4. The switch is shown by the phantom representation of sensing mass 12 in its initial position adjacent the reset end of the switch with no acceleration applied. The acceleration actuated switch, at this point, is considered to be completely assembled with all contact arms in their initial or final position and with chamber 30 filled with the desired damping fluid and sealed, except for the final sealing with sealant 102 around the adjustable conductor and contact arm pins. When an acceleration force, designated by the arrow identified as A, is applied to the switch of sufficient strength and duration to overcome the force bias of spring 40 and the delay of orifice 58, sensing mass 12 will move along shaft 32 within chamber 30. If the acceleration A is maintained at the level at which contact closure between contact arms 74 and 76 is desired, the sensing mass 12 will assume a secondary position with contact arm 74 wiping against shorting ring 62, as shown by the solid representation of mass 12. Because of variations in manufacture of the components of the acceleration actuated switch, fixed contact arm 74 may be located anywhere along the width of ring 62. While maintaining the acceleration at the desired level, an appropriate spanner wrench 104 is brought into contact with bores 94 of nut 90. With wrench 104 rotated by drive means 106, the coaction of annular shoulder 92, nut 90 and threaded portion 88 will effect movement of adjustable contact arm 76 towards ring 62. When contact arm 76 wipes against at the leading edge of shorting ring 62 a circuit closure indicator 108 may indicate contact therewith and discontinue movement of contact arm 76 by stopping drive means 106. While maintaining nut 90 in this final position by spanner wrench 104, another appropriately shaped annular spanner wrench (not shown) may be brought into contact with bores 100 of ring 98 and the same tightened against nut 90 through washer 96 to fix nut 90, and consequently adjustable contact arm 76, in position. The respective spanner wrenches may then be disengaged from the respective nut and ring and sealant 102 applied thereto. The acceleration actuated switch 10 is thus adjusted in its final manufactured form to the desired acceleration level at which it is supposed to effect circuit closure.

The application of an acceleration force to the switch in the sequence shown in FIG. 4, may be applied with a standard centrifuge having drive means 106 and the respective spanner wrenches and circuit closure indicators mounted on the centrifuge. The desired sequence of operation and adjustment of the nut and locking ring may be achieved with commonly available control apparatus. Further, the circuit closure may be monitored with conventional low voltage and low current sources to minimize or prevent damage or pitting of contact surfaces.

If it is desired to sense a still different level of acceleration, another pair of fixed and adjustable contacts (not shown but having pins 110 and 112 extending from member 14) having a similar arrangement to that shown with respect to conductor arms 74 and 76. Thus, with the embodiment shown in FIGS. 1 and 2, measurement of two separate acceleration force levels as well as a monitoring of the reset of the sensing mass may be achieved.

Space permitting, additional pairs of fixed and adjustable contact arms may be positioned within reset member 14 to provide still additional acceleration force level switch closures. If it is desired, the contact arms and conductors may be carried by actuate member 16, so long as the contact arms and conductors do not impede the movement of sensing mass 12 or the operation of orifice 58. In addition, an acceleration actuated switch may be made using only adjustable contact arms so that the acceleration actuated switch may be adjusted after manufacture to provide circuit closure at any number of acceleration force levels within the range of the helical spring 40 force bias capabilities.

It will be appreciated that the shorting ring 62 may be replaced by conductive members which pass only part way around sensing mass 12 from one contact pair position to another to provide still additional flexibility of design. Also, the shorting conductor may be on the surface of sensing mass 12 parallel to the longitudinal axis of shaft 32 with one contact arm passing through one end member and an adjustable contact arm passing through the other end member. The adjustable contact arm, in such an embodiment, may be adjusted by either inserting the contact arm still further into the chamber 30 or by withdrawing the same.

An acceleration actuated switch made in accordance with that shown in FIGS. 1 and 2, provided switch closures at 12 and 18 g in a housing about 1 inch in diameter and 2.6 inches long with an overall volume of 2.2 cubic inches and weight of 0.25 pound. The switch closures occurred within ±5% of these acceleration levels under operating temperatures from about −20° to +160°F.

The sensing mass body may be made of any appropriate high density material in solid or particulate form. A particularly desirable material is a sintered tungsten alloy powder which is held together by a bonding agent and then pressed under temperature. The respective housing members may be made from suitable conducting or nonconducting materials (depending upon the form of the conductors and contact arms) such as certain plastics like glass filled dialyll orthopthalate. The sealant around the respective conductor pins and elsewhere may be any appropriate epoxy or silicone sealant, or the like. Coating 64 may be a high temperature epoxy of similar material.

If it is desired, contact adjustment after complete switch assembly may also be achieved using other sensing mass forms and positive spring constant force biasing arrangements. For example, a roller-band with appropriate band or the like applied force biasing may be substituted for the sensing mass 12 and helical spring 40 described above. Such roller-band sensing masses and their operation are described in U.S. Pat. Nos. 3,452,175 and 3,452,309 to D. F. Wilkes. With the roller-band type sensing mass and force biasing, the contact arms may be brought into conductive engagement with portions of either the band or the roller members.

What is claimed is:

1. An acceleration actuated switch comprising a sealed tubular housing including an inner wall and spaced apart reset and actuate walls forming an enclosed chamber therebetween and an annular portion projecting inwardly beyond said inner wall into said chamber intermediate and spaced from said reset and actuate walls; a damping fluid filling said chamber; a sensing mass within said chamber having all portions spaced from said inner wall of said housing and including an electrically conductive ring having a leading edge portion at the exterior of said sensing mass, said sensing mass being movable between an initial location and secondary locations and including an outwardly projecting annular portion adjacent and in registry with said inwardly projecting portion at said initial location and forming therewith an annular restricted orifice at said initial location for metering of said damping fluid only during initial movement of said mass and forming with said inner wall when out of said registry an annular widened opening; helical spring means for yieldably positioning said sensing mass at said initial location adjacent said reset wall and resisting movement of said sensing mass toward the actuate wall when said mass is subjected to acceleration forces; a plurality of electrical conductor pairs carried by and extending through at least one of said housing walls into said chamber with each conductor of said conductor pairs carrying an electrical contact normally spaced radially outwardly from said sensing mass but disposed in the path of movement of said electrically conductive ring between said initial and a secondary location, one of said electrical contacts of each pair being positioned adjacent one of several of said secondary locations and registering with said conductive ring when the sensing mass is at said secondary locations; and means carried by said one housing wall and accessible from the exterior of said housing for selectively positioning the other of said electrical conductors of each pair and its electrical contact to contact with said leading edge portion of said electrically conductive ring at each of said secondary locations corresponding with said other positioned contacts of said conductor pairs.

2. The switch of claim 1 wherein each of said selectively positionable conductors are slidably supported within recesses and passageways of said housing with threaded portions extending through said housing to the exterior thereof.

3. The switch of claim 2 wherein each of said recesses and passageways of said housing includes an annular shoulder and said switch includes an annular member threaded about said conductor threaded portions abutting against said annular shoulder.

4. A method of adjusting an acceleration actuated switch to provide a circuit closure at a desired acceleration force level wherein the switch includes a sensing mass at an initial location movably supported against a positive spring constant force bias in a sealed housing filled with a damping fluid and having therein a first contact and a second contact normally spaced from said sensing mass but in the path of movement of a conductive portion of said mass and movable along the direction of movement of said mass from the exterior of said housing and means whereby said sensing mass is subjected to an increased level of damping by said fluid during initial movement thereof from said initial location, comprising positioning said first contact at another location in the path of movement of said conductive portion of said sensing mass to which the sensing mass will move in response to said desired acceleration force, subjecting said housing and said sensing mass to an acceleration force in the direction of said force bias at said desired acceleration force level of sufficient amplitude to partially overcome said force bias, subjecting said sensing mass to an increased level of said fluid damping during initial movement thereof from said initial location, continuing said acceleration force for a time sufficient to overcome said initial increased fluid damping providing movement of said mass to said another location in said housing determined primarily by said acceleration force level and the spring constant force bias, moving said second contact into engagement with the leading edge of said conductive portion of said sensing mass while maintaining said acceleration force level, and locking said second contact in said engaging position, and terminating said acceleration force level.

* * * * *